3,514,623
CONTROL SYSTEM FOR OPERATING ELECTRICAL AUTOMOTIVE ACCESSORIES INDEPENDENTLY OF OTHER AUTOMOTIVE ACCESSORIES

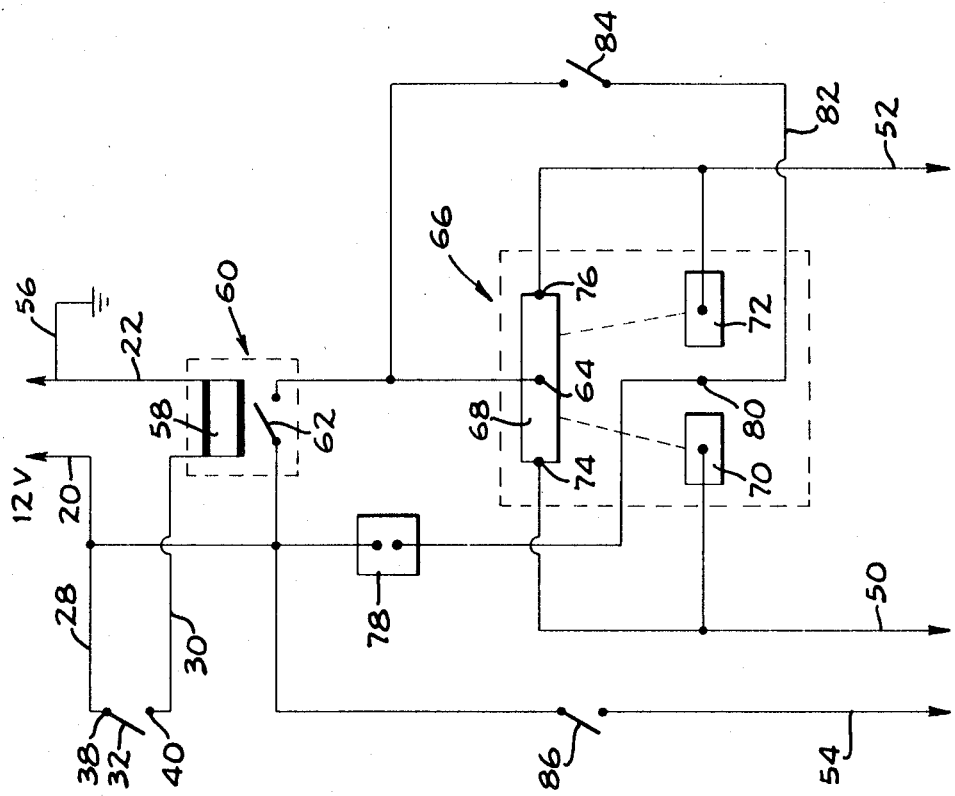
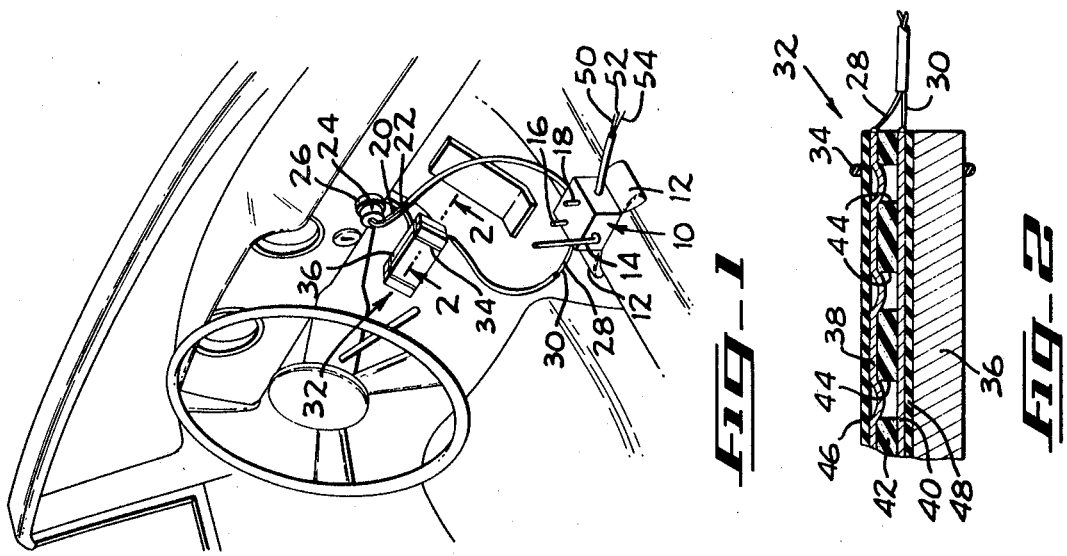
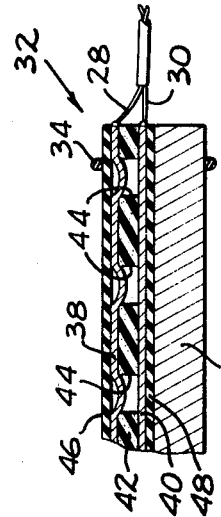
INVENTOR
JOHN D. BALLARD
BY *Paul B. File*
PATENT AGENT

John D. Ballard, 15270 Winton Way,
San Jose, Calif. 95124
Filed Nov. 20, 1967, Ser. No. 684,275
Int. Cl. B60g *1/44*
U.S. Cl. 307—10                            4 Claims

ABSTRACT OF THE DISCLOSURE

An electric control system which can be simply attached, mechanically and electrically to an existent automotive vehicle to provide control for various accessories such as the light system of a trailer. The control system is a circuit including a pressure operated switch responsive to foot pressure and manual controls housed in a box which may be placed on the central floor section of the passenger compartment of an automobile.

---

The present invention relates generally to electrical control systems and, more particularly, to an electrical control system that can be temporarily connected to the existing electrical power supply of an automotive vehicle to enable control of accessories, such as the lights or brakes of a trailer.

BACKGROUND OF THE INVENTION

It is, of course, necessary when attaching a trailer to an automobile or truck to provide for electrical connections to the existing lights on the trailer and, in some cases, to an electric brake system thereon. The most common practice is to connect, usually through the use of safety pins, wires from the trailer to the existing tail and brake light wires in the automobile. Difficulties are encountered in making connections properly; failure of the electrical connection is not uncommon and frequently a turn-signal connection is reversed so that improper light indication on the trailer results. Furthermore, even if the connection be properly made, an additional electrical load is added to the existing system so that the brake lights will be relatively dim and the flashing turn-signal indications will be both dim and rapid so as to provide a rather poor turn indication.

SUMMARY OF THE INVENTION

In view of the aforementioned difficulties, it is a general objective of the present invention to provide an electric control system which can be temporarily placed in an automotive vehicle enabling connection of the existing automotive power supply directly to an accessory, such as the electric light or brakes of a trailer, as a completely separate circuit so that no interference with the existing electrical circuitry of the automobile is experienced. Generally, in accordance with the invention, to control the brake lights of the trailer, a temporary control unit can be placed in the passenger compartment of the automobile, preferably on the floor below the dashboard enabling a simple power supply connection to be made to the cigarette-lighter socket, as found on substantially all automobiles, and also enabling a pressure-responsive control switch to be removably attached to the existing brake pedal. The control unit can include additional manual control elements, such as a turn signal switch or an emergency flasher switch and a single group of wires can be passed from such control unit back to the trailer to facilitate connection. The circuit is quite straightforward and can utilize commercially available components, such as existing flasher units or turn-signal mechanisms, but preferably employs a novel pressure-responsive switch which can be removably attached to the brake pedal so that application of foot pressure to the brake pedal in the normal fashion will actuate through the control circuit, the brake lights on the trailer immediately in response to the application of such pressure. The closure of this pressure-responsive switch can be arranged in advance of the engagement of vehicle brakes so that if the switch is used to control the electric brakes on a trailer, such electric brakes will be brought into engagement prior to the engagement of the vehicle brakes which facilitate stopping of the entire mobile combination including the automobile and the trailer pulled thereby.

While the invention will be described in detail hereinafter relative to the control of the electric light system of the trailer, it is to be understood that any other accessories can be controlled either on a temporary or permanent basis with an electrical control system embodying the essential features of the invention. Slight modifications would enable the control of accessories on the automobile itself; for example, additional power assist systems to braking could be controlled by the connection of the pressure-responsive switch on the brake pedal and by the changed location of such pressure-responsive switch to the clutch pedal of a vehicle or to its accelerator pedal, additional electric power controls could be energized.

BRIEF DESCRIPTION OF THE DRAWING

The aforementioned summary of the invention and the manner in which the objective is achieved will be more readily understood by reference to the following detailed description of one embodiment of the invention, illustrated in the accompanying drawing wherein:

FIG. 1 is a fragmentary perspective view of an electrical control system embodying the invention as installed in the front passenger compartment of an automobile, FIG. 2 is an enlarged sectional view taken substantially along line 2—2 of FIG. 1, illustrating the structural details of a preferred pressure-responsive switch mounted to the brake pedal on the vehicle, and FIG. 3 is an electric circuit diagram of the system.

DETAILED DESCRIPTION OF THE ILLUSTRATED EMBODIMENT

With initial reference to FIG. 1, a major portion of the electrical control system embodying the invention is housed within a small box 10 that may be placed conveniently on the central floor section of the passenger compartment of an automobile. Preferably, a pair of weights, in the form of small sand bags 12, are attached to opposite sides of the box 10 to hold the same firmly in position in the described location, but to enable ease of its removal when desired.

A handle 14 projects upwardly from the box to control a turn-signal switch, to be described hereinafter, and additional toggle arms 16, 18 also project from the top of the box to enable control of the tail lights and an emergency flasher switch incorporated in the circuit.

To provide power to the system, a pair of wires 20, 22 extend upwardly from the box for connection at their extremity to a small plug 24 designed for insertion into the existent cigarette-lighter socket 26, thus providing electrical connection to the automobile battery which, of course, conventionally constitutes a 12 volt source.

For control of the lights of a trailer, additional wires 28, 30 lead from the side of the box 10 to a pressure-responsive switch 32 that is removably mounted by a pair of rubber bands 34 or alternate means to the exposed face of the brake pedal 36 of the vehicle. The switch 32 is arranged, as can be more readily envisioned by reference to FIG. 2, to close when a foot is placed thereagainst for the purpose of applying the vehicle brakes. Preferably, as clearly shown in FIG. 2, the pressure-responsive switch 32 includes two metallic plates 38, 40 which are normally electrically separated by an intermediate resilient insulator 42 which can take the form of a small foam cushion having a plurality of openings 44 therethrough. Adjacent these openings, the upper plate 38 is slightly dimpled so that if pressure is applied downwardly against the upper plate, the resilient insulator 42 will compress and allow the dimpled sections to contact the lower plate 40 and establish closure of the switch 32. Additional insulating covers 46, 48 are placed over the top and bottom of the plates 38, 40 so that no accidental shorting of the circuit can occur. The two plates 38, 40 form the terminals of the switch 32 and are simply connected as by soldering through the mentioned wires 28, 30 which, as previously mentioned, extend into the control box 10. The wires 28, 30 are sufficiently long so that they will not interfere with the operation of the brake pedal 36, nor will they be placed under any tensional force regardless of the position of the brake pedal and the switch 32 thereon.

For establishing electrical connection with the trailer lights, three wires 50, 52, 54 of appropriate length extend from the control box 10 and can be conveniently passed through the side window of the vehicle and thence to the trailer for appropriate connection to the trailer lighting system, a suitable standard plug and socket or alternate means (not shown) being provided to enable quick connection or disconnection when required.

For installation, it is obvious that a simple connection of the plug 24 into the cigarette-lighter socket 26, a simple mounting of the pressure-responsive switch 32 on the brake pedal 36 by use of the rubber bands 34 or any alternative means, and a subsequent connection to the trailer light circuit is all that is required so that the entire unit can be installed in a manner of minutes. Similarly, the entire unit can be removed from the automobile in a very short period.

The actual electrical circuit, as shown in diagrammatic form in FIG. 3, is generally conventional, including the two wires 20, 22 extending to the plug 24 for the cigarette socket 26, one of which will, of course, be grounded, as indicated at 56, and the other of which is connected to the 12 volt battery potential.

For control of the brake lights on the trailer, one wire 28 from the 12 volt source passes to one terminal 38 of the pressure-responsive switch 32 which, of course, is normally open, as illustrated in FIG. 3, but when closed establishes a complete circuit through the coil 58 of a conventional relay 60 whose other terminal is grounded. In this fashion, only small wires need be connected to the pressure-responsive switch 32, permitting the desired flexibility of such connection.

When the relay coil 58 is energized, the relay switch 62 is closed to establish electrical connection from the 12 volt source to one terminal 64 of a standard turn-signal switch 66 whose physical position is determined by the previously described control handle 14. When such control handle 14 is centered, three small bus bars 68, 70, 72 are located, as shown in FIG. 3, and the 12 volt potential is accordingly applied through the upper bus bar 68 to two outer terminals 74, 76 at the opposite extremities of the bus bar to establish connection with the brake lights, both at the left and right on the trailer through the two of the elongated wires 50, 52.

An additional connection is made from the 12 volt source through a standard flasher switch 78 to an additional lower central terminal 80 of the turn-signal switch 66 and when the handle 14 is centered, as shown in FIG. 1 and as electrically illustrated in FIG. 3 no connection from this terminal is made to either the left or right lights of the trailer. However, if the turn-signal handle 14 is to provide a flashing right-turn signal, the three bus bars 68, 70, 72 are moved as a unit to the left, as viewed in FIG. 3, so that the lower bus bar 72 is connected between the switch terminal 80 and the right brake light wire 52, while the other remains an open circuit. At the same time the upper bus bar 68 moves also to the left and the application of pressure to the brake pedal 36 will establish a braking light connection only to the left brake light wire 50, thus not interfering with the flashing of the right-turn signal. Obviously, the movement of the turn signal handle 14 to the left turn position will achieve precisely the opposite result, the left brake light then flashing while the right brake light will be turned on steadily when the brake pedal 36 is depressed and the pressure-responsive switch 32 is consequently closed. The turn-signal switch terminal 80 to which the flasher switch 78 is connected, is connected by an additional wire 82 through an emergency flasher switch 84 which can be manually closed to then connect that terminal to the top center terminal 64 of the turn-signal switch 66, thus to actuate a flashing action of both brake lights for emergency signaling purposes.

Finally, the circuit can also incorporate a tail light switch 86 for the trailer, this consisting of a simple switch connected directly to the 12 volt source and to the other wire 54 for ultimate connection to both tail lights of the trailer.

In summary, a rather simple electrical circuit is utilized and, as will be seen from the foregoing description, incorporates standard components, such as the flasher switch 78, the relay 60, and a conventional turn-signal switch 66 as well as standard toggle switches 84, 86. Since the circuit is connected completely separate from the existing circuit of the automobile, no interference with its operation will result.

As previously mentioned, it is obvious that the system as described could be used to energize electric brakes rather than the electric lights in response to closure of the pressure-responsive switch on the brake pedal and various other alterations and modifications to actuate accessories either on the trailer or on the vehicle itself can be envisioned without departing from the spirit of the invention, and the foregoing description of one exemplary embodiment is not to be considered in a limiting sense, and the actual scope of the invention is to be indicated only by reference to the appended claims.

What is claimed is:

1. An electric control system for accessories on automotive vehicles or the like having a control pedal or the like which comprises,
   a pressure operated switch removably mounted on the portion of the control pedal where foot pressure is first applied, and
   an electric circuit connected to said switch and adapted for energizing connection to an electrical accessory system, said electric circuit including a plug adapted for insertion into the cigarette lighter socket of the automotive vehicle for utilization of the existing power supply of an automobile.

2. An electric control system according to claim 1 wherein said accessory is the brake light circuit on an automobile drawn trailer and wherein means are provided for directly connecting said pressure operated switch in said electric circuit to said brake lights of said trailer wherefore the brake lights are energized in response to closure of the pressure-responsive switch.

3. An electric control system according to claim 2 wherein
said electric circuit includes an alternative flasher circuit connection to the brake light of the trailer.

4. An electric control system according to claim 3 wherein
said electric circuit includes a manual switch removably mounted in the passenger compartment of the automotive vehicle for control of the flasher circuit.

References Cited

UNITED STATES PATENTS

| | | |
|---|---|---|
| 2,046,976 | 7/1936 | Sorensen. |
| 2,222,765 | 11/1940 | Geyer _____ 340—72 |
| 2,790,873 | 4/1957 | Fleming _____ 200—86 |
| 2,822,441 | 2/1958 | Fortney _____ 200—86.5 |
| 3,243,773 | 3/1966 | Leichsenring _____ 340—72 |

ROBERT K. SCHAEFER, Primary Examiner

T. B. JOIKE, Assistant Examiner

U.S. Cl. X.R.

307—150; 315—80; 320—2; 340—71